No. 882,647. PATENTED MAR. 24, 1908.
E. H. NELSON.
HOG TRAP.
APPLICATION FILED OCT. 19, 1907.
2 SHEETS—SHEET 1.
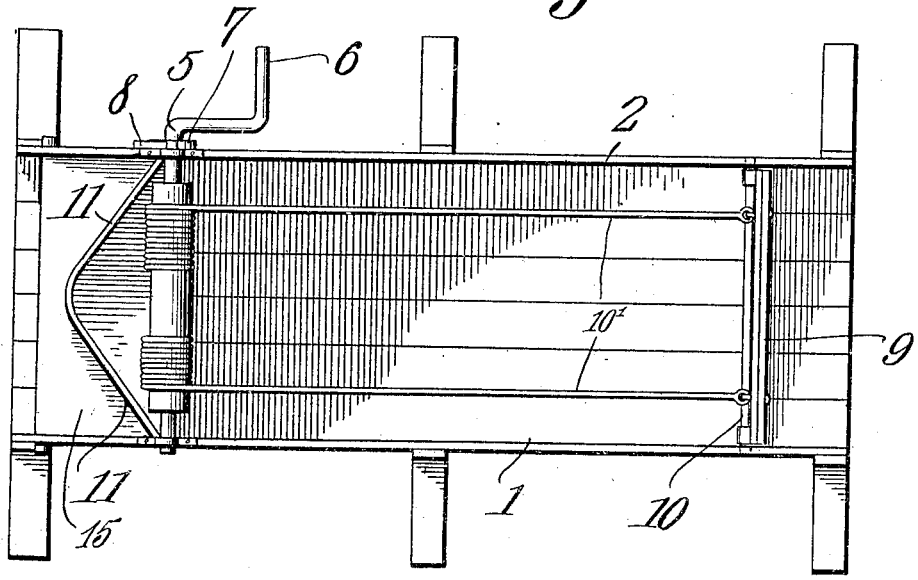
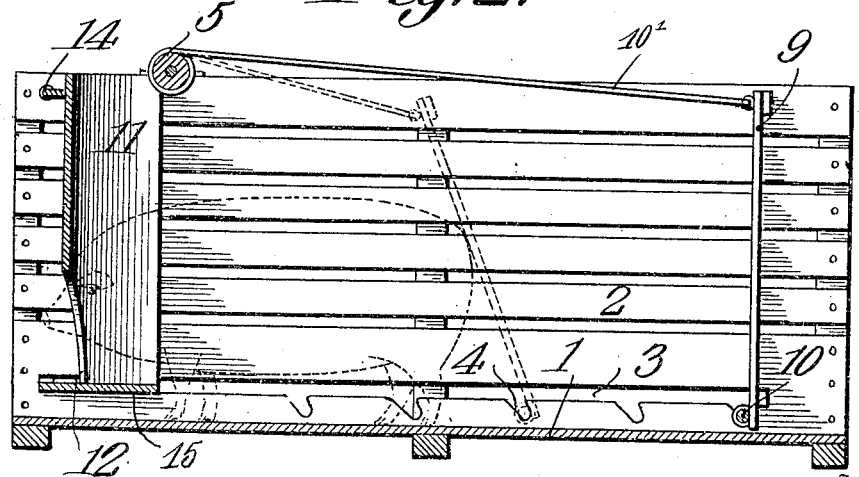
Witnesses
E. H. Stewart
E. Daniels
Inventor
Edgar H. Nelson.
By C. A. Snow & Co.
Attorneys

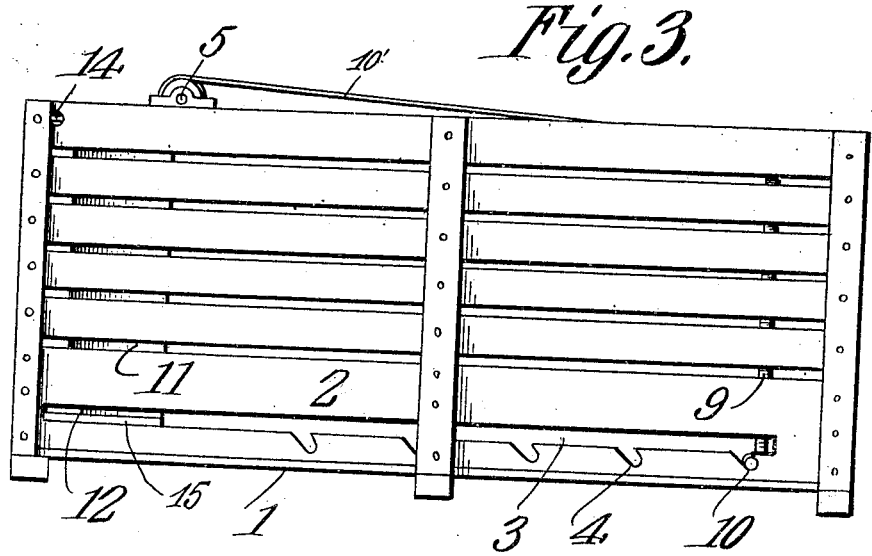
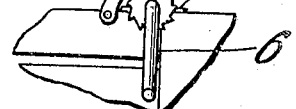
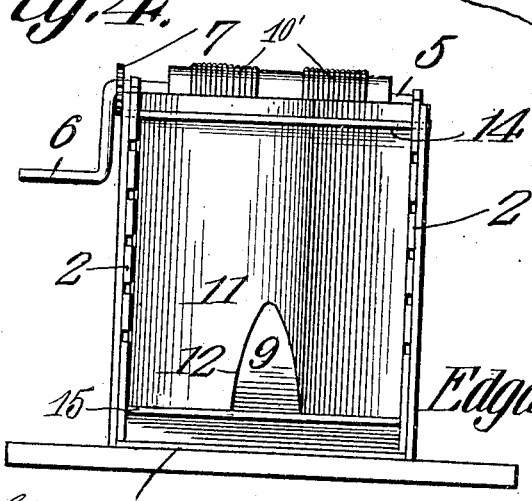

UNITED STATES PATENT OFFICE.

EDGAR H. NELSON, OF GLENVILLE, MINNESOTA.

HOG-TRAP.

No. 882,647.   Specification of Letters Patent.   Patented March 24, 1908.

Application filed October 19, 1907.  Serial No. 398,217.

*To all whom it may concern:*

Be it known that I, EDGAR H. NELSON, a citizen of the United States, residing at Glenville, in the county of Freeborn and State of Minnesota, have invented a new and useful Hog-Trap, of which the following is a specification.

This invention has relation to hog traps and it consists in the novel construction and arrangement of its parts as hereinafter shown and described.

The object of the invention is to provide a means for entrapping hogs and for holding the same during the operation of placing rings in their noses.

Figure 1 is a top plan view of the trap. Fig. 2 is a longitudinal sectional view of the same. Fig. 3 is a side elevation of the same. Fig. 4 is an end elevation of the same and, Fig. 5 is a detail view of a portion of a side of the trap with a rotating shaft mounted thereon.

The trap consists of the bottom 1 having the vertical parallel sides 2. The sides 2 are provided near their lower edges with longitudinally disposed slots or openings 3 which are provided at intervals along their lower edges with the depressions 4. The shaft 5 is journaled for rotation between the upper portion of the sides 2 and is provided with a crank handle 6 and a ratchet wheel 7. The pawl 8 is pivoted upon one of the sides 2 and is adapted to engage the ratchet wheel 7 to prevent reverse rotation of the shaft 5. The door 9 is provided with a shaft 10 the ends of which enter the slots 3. The cables 10' are attached to the free edge of the door 9 and are arranged to wind upon and unwind from the shaft 5. The shaft 10 may move longitudinally of the slots 3 and enter any of the depressions 4 provided in the edges thereof. One end of the trap is closed by a head piece which consists of a vertically disposed portion 11 substantially V-shaped in horizontal section and which is provided at its lower end with an opening 12 adapted to receive the nose of the animal. The upper end of the portion 11 is supported by means of a shaft 14 attached thereto and which is journaled in the sides 2 of the trap. The lower end of the portion 11 is retained against outward movement with relation to the body of the trap by the cross piece 15 which passes transversely through the sides 2 and against which the lower end of the portion 11 bears. When the cross piece 15 is so positioned in the sides 2 it bears at its edges against the corner posts of the body of the trap and consequently is retained against movement beyond the end of the trap. The said cross piece also lies in the path of the arc described by the lower end of the portion 11 and thereby limits the swinging movement of the lower end of the portion 11.

In operation the door 9 is permitted to swing down with its free edge substantially in alinement with the bottom 1. An animal is then driven or lured over the said door upon the bottom 1 and between the sides 2. An operator then turns the crank 6 which rotates the shaft 5 and the cables 10' are wound thereon. Thus, the free edge of the door 9 is swung up and the animal is entrapped. By continued turning of the shaft 5 the cables 10' draw the door 9 longitudinally along the sides 2, the shaft carried by the door 9 moving in the slots 3 which serve as guides. Thus, the said door 9 is moved toward the head piece of the trap and the notches 4 serve to prevent the lower edge of the door from being forced or swung away from the animal and liberating the same. Thus, the animal is crowded against the V-shaped portion 11 of the head piece and in seeking an escape it projects its nose through the opening 12 in the portion 11. As the animal is confined in this position an operator may readily apply a ring to its nose when the door 9 may be retracted thus liberating the animal or the cross piece 15 may be withdrawn which would permit the head piece to swing and liberate the animal.

Having thus described my invention, what I claim as new and desire to secure by Letters-Patent is:—

A trap comprising a body having in its sides elongated slots the lower edges of which are provided with depressions, a head piece mounted upon the body and having an opening, a door hingedly mounted in said slots and adapted to move longitudinally thereof and having hinged members adapted to enter the depressions of the slots and means for operating the door.

In testimony that I claim the foregoing as my own, I have hereto affixed my signature in the presence of two witnesses.

EDGAR H. NELSON.

Witnesses:
　LAURENCE PAULSON,
　CHAS. P. MORRISON.